(12) United States Patent
Monk et al.

(10) Patent No.: US 10,145,970 B2
(45) Date of Patent: Dec. 4, 2018

(54) METHOD FOR ACQUIRING SEISMIC DATA (71) Applicant: APACHE CORPORATION, Houston, TX (US)

(72) Inventors: David Monk, Brazoria, TX (US); Michael S. Bahorich, Houston, TX (US); William N. Goodway, Calgary (CA)

(73) Assignee: APACHE CORPORATION, Houston, TX (US)

( * ) Notice: Subject to any disclaimer, the term of this patent is extended or adjusted under 35 U.S.C. 154(b) by 27 days.

(21) Appl. No.: 15/316,896

(22) PCT Filed: Jun. 15, 2015

(86) PCT No.: PCT/US2015/035778
§ 371 (c)(1),
(2) Date: Dec. 7, 2016

(87) PCT Pub. No.: WO2015/195532
PCT Pub. Date: Dec. 23, 2015

(65) Prior Publication Data
US 2017/0108601 A1  Apr. 20, 2017

Related U.S. Application Data

(60) Provisional application No. 62/013,092, filed on Jun. 17, 2014.

(51) Int. Cl.
*G01V 1/20* (2006.01)
*G01V 1/00* (2006.01)

(52) U.S. Cl.
CPC ............... *G01V 1/20* (2013.01); *G01V 1/003* (2013.01); *G01V 2210/144* (2013.01)

(58) Field of Classification Search
CPC ..... G01V 1/20; G01V 1/003; G01V 2210/144
USPC .......................................................... 367/56
See application file for complete search history.

(56) References Cited

U.S. PATENT DOCUMENTS

| | | | |
|---|---|---|---|
| 8,228,757 B2 | 7/2012 | Beffa | |
| 8,521,437 B2 | 8/2013 | Moore | |
| 9,678,233 B2 * | 6/2017 | Abma | G01V 1/3808 |
| 2009/0279386 A1 | 11/2009 | Monk | |
| 2010/0302086 A1 * | 12/2010 | Dudgeon | G06K 9/6289 341/155 |
| 2014/0043934 A1 | 2/2014 | Vasconcelos | |
| 2014/0219053 A1 * | 8/2014 | Goujon | G01V 1/162 367/38 |

(Continued)

*Primary Examiner* — Daniel L Murphy
(74) *Attorney, Agent, or Firm* — Richard A. Fagin (57) ABSTRACT

A method for seismic surveying includes deploying a group of vertically sensitive seismic particle motion responsive sensors at each of a plurality of geodetic survey positions. The groups each include at least two sensors spaced apart by a first selected horizontal distance. The groups are separated from each other by a second selected distance larger than the first distance. Signals detected by each of the sensors resulting from actuation of a seismic energy source are recorded. At least one of an in-line and a cross-line component of a gradient of the vertical component of the seismic wavefield is determined at each group location by determining a difference between the signals detected by each sensor in a respective group.

15 Claims, 6 Drawing Sheets

(56) References Cited

U.S. PATENT DOCUMENTS

2014/0286128 A1* 9/2014 Grimm .................. G01V 1/28
                                                          367/24
2014/0336939 A1   11/2014 Brune

* cited by examiner

METHOD FOR ACQUIRING SEISMIC DATA

BACKGROUND

This disclosure is related to the field of reflection seismic data acquisition. More specifically, the disclosure relates to methods for acquiring seismic data that include measurement related to a vertical particle motion wavefield gradient transverse to the vertical direction in order to interpolate the detected wavefield between seismic sensor positions.

Marine seismic data is known in the art to be acquired through measurements of pressure in response to actuation of a seismic energy source using sensors such as hydrophones disposed at longitudinally and laterally spaced apart locations along a plurality of laterally separated marine streamers towed behind a survey vessel. More recently, marine seismic data has been acquired using both pressure or pressure time gradient measurements and measurements of particle motion, particle acceleration or particle velocity using co-located pressure and motion responsive sensors, e.g., hydrophones and geophones in marine streamers as described above. Obtaining both pressure and particle motion signals from a seismic wavefield enables, e.g., separation of wavefield direction of motion with respect to the sensors, and as a result up-going and down-going wavefields can be distinguished and separated from detected seismic signals.

More recently, marine seismic data acquisition systems have been introduced which measure a horizontal gradient of the pressure wavefield (see, e.g., U.S. Pat. No. 8,521,437 issued to Moore). Measuring the horizontal pressure wavefield gradient enables further improved understanding of the detected wavefield. Using the measured horizontal wavefield gradient it is possible, for example, to reconstruct the full wavefield at locations where measurements were not made, e.g., between seismic sensor positions along a streamer, or between adjacent streamers. While pressure gradient measurement is readily performed in a marine environment, where the acoustic medium in which the sensors is disposed (water) is essentially homogeneous, and gradient measurement of the pressure can be made relatively easily, devices which measure the horizontal gradient of the vertical particle velocity, particle acceleration or particle motion wavefield have not been used.

Onshore (i.e., land-based) seismic data is typically acquired using geophones (velocity sensitive detectors) or other particle motion responsive sensors disposed in a selected pattern proximate the ground surface. Geophones may be arranged to make a single vertical component measurement at each sensor location, or alternatively, measurements of both vertical and horizontal particle motion, acceleration or velocity measurements may be made with three-component geophones which separately measure velocity in three (typically mutually orthogonal) directions. However, three component, single position velocity or particle motion measurements do not provide measurements usable to determine the horizontal gradient of the vertical particle motion (or acceleration or velocity) wavefield.

DETAILED DESCRIPTION

In embodiments of a method according to the present disclosure, measurements of a horizontal gradient of a vertical seismic particle motion wavefield (or of velocity of acceleration of the same vertical seismic wavefield) may be obtained at any selected geodetic position by measuring vertical motion (e.g., using accelerometers, geophones or other particle motion responsive sensors) induced in the subsurface by an imparted seismic wavefield at two or more closely spaced (horizontally separated) locations and calculating a difference between such measurements. Ideally, the horizontal displacement or spacing between the sensors used to make such measurements would be very small so as to more accurately represent the horizontal gradient proximate the measurement geodetic position. In practice, however, small horizontal spacing makes the measurements more sensitive to surface noise such as "ground roll" and environmental noise, among other types of noise. Larger horizontal distances between the sensors used to make the measurements for gradient determination may not provide an accurate measurement of the local horizontal gradient because different parts of the vertical wavefield may be measured by each of the sensors used. In example embodiments according to the present disclosure, it may be useful to test various spacings between the two or more sensors to determine a suitable minimum spacing in which the gradient may be detected above the level of noise. Sensor spacing in a range of 1 meter to 20 meters have been tested and found to be useful, with an optimum spacing between 10 and 20 meters depending on, for example, the noise level, the surface topography and the soil composition. In order to measure the horizontal gradient of the vertical wavefield in two orthogonal directions, at least three sensors may be used, preferably in a pattern with some degree of orthogonality, but any triangular arrangement may also be used.

It is possible to use conventional, cable-connected seismic sensor systems to place two or more sensors at locations close to each other as described above (e.g., between 10 m and 20 m spacing) for a single geodetic position, and then separate such closely spaced sensors by a relatively large distance to similar groupings of seismic sensors. Such arrangement would provide a group of seismic sensors at each of a plurality of different geodetic positions. The foregoing arrangement may not be operationally efficient because cable-connected seismic sensor systems typically have equally spaced apart sensors. However, autonomous, multichannel sensor nodes which are used for seismic acquisition may be separated by any selected distance. If each autonomous, multichannel sensor node is configured for transmitting signals and/or recording signals from at least three separate input signal channels, then it would be possible to arrange closely spaced seismic sensor groups each having two or more individual sensors as explained above to determine the local horizontal gradient of the vertical seismic particle motion wavefield approximately at the position of each autonomous sensor node in two orthogonal directions, and to make similar measurements at discrete geodetic positions associated with the each of the autonomous node locations. The scope of the disclosure is not limited to three-channel vertical particle motion signal acquisition at each sensor node location, however. The autonomous sensor nodes may be spaced at any selected distance from each other consistent with the objectives of the particular seismic survey.

A possible advantage of such an arrangement of seismic sensors and sensor nodes is that it may reduce the operational cost of seismic data acquisition, and increase the fidelity of the recorded and interpolated seismic signal data.

Figure 1A:
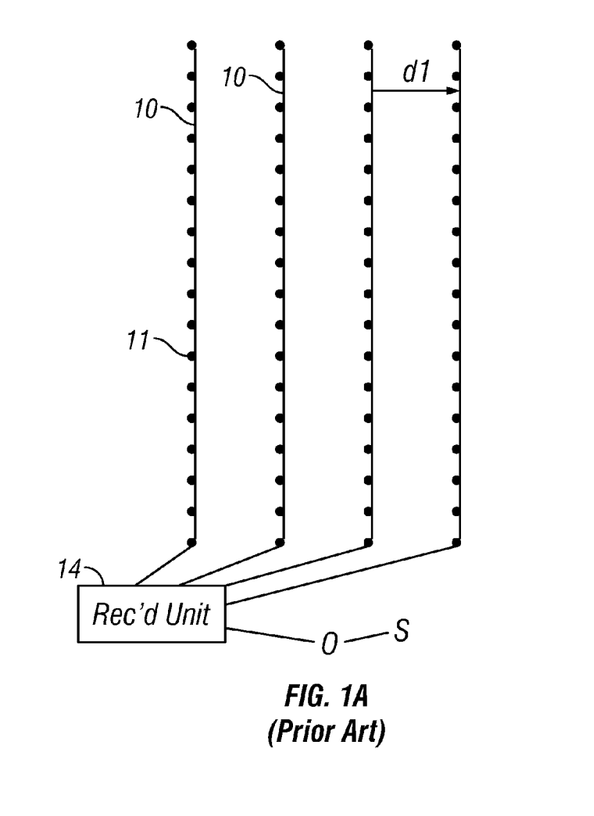
FIG. 1A shows a conventional land-based cable-connected seismic sensor array.

FIG. 1A shows an example arrangement of conventional, cable-connected seismic sensors, wherein the cables are shown at 10, the seismic sensors at 11, and a distance between adjacent cables 11 is shown as d1. The seismic sensors 11 may be single component or three (orthogonal) component sensors, e.g., geophones, velocimeters or accelerometers. Signals detected by the sensors may be transmitted along the cables 10 to a recording unit 14 where a recording of the signals detected by the sensors 11 may be made indexed to an actuation time of a seismic energy source S. The recording unit 14 may include components (not shown separately) to actuate the source S at selected times and to index the recordings made of the signals from each of the sensors 11. The significance of the distance d1 will be further explained below.

Figure 1B:
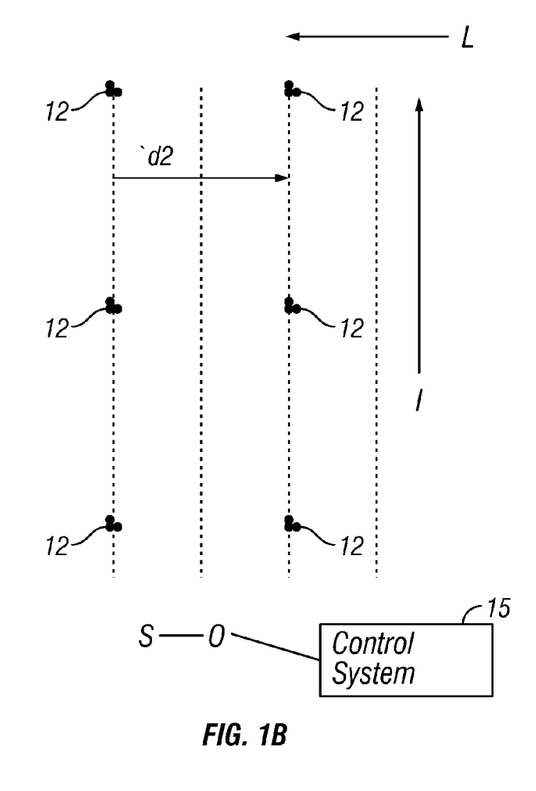
FIG. 1B shows an example arrangement of multiple sensor nodes according to an example embodiment.

FIG. 1B shows an autonomous nodal seismic sensor signal acquisition system including a plurality of autonomous sensor nodes 12 deployed at selected geodetic positions. The sensor nodes 12 may be configured to detect signals from three, closely spaced seismic sensors (see FIGS. 2A, 2B, 2C). The sensor nodes 12 may include signal recording and/or wireless signal transmission circuitry (not shown separately) to either or both record detected seismic signals in each sensor node 12 and transmit the detected signals to a control unit 15. The control unit 15 may include circuitry (not shown separately) to actuate a seismic energy source S at selected times. The actuation times may be preprogrammed into each sensor node 12 so that autonomous recordings of detected seismic signals may be made that are indexed to the actuation times for recording-type nodes. In other embodiments, the sensor nodes 12 may communicate wirelessly with the control unit 15 so that the detected seismic signals are communicated to the control unit 15 for recording therein indexed to the source S actuation times. One example embodiment of wireless seismic signal detection and transmission is described in U.S. Pat. No. 8,228,757 issued to Beffa et al.

The seismic energy source S may be any seismic energy source known in the art, including without limitation explosives, air or water guns, or arrays thereof, or vibrators or arrays thereof.

In FIG. 1B, the sensor nodes 12 may be separated by a selected distance d2. The distance d2 may be greater than the distance between the distance d1 (FIG. 1A) for any spatial sampling interval to be surveyed using the cable based system shown FIG. 1A. In some embodiments, the distance d2 may be at least twice the distance d1. Methods according to the present disclosure have been tested using the distance d2 of as much as eight times the distance d1 without spatial aliasing. In FIG. 1B, the in-line direction of the sensor arrangement is shown at I. The cross-line direction is shown at L.

Figure 2A:
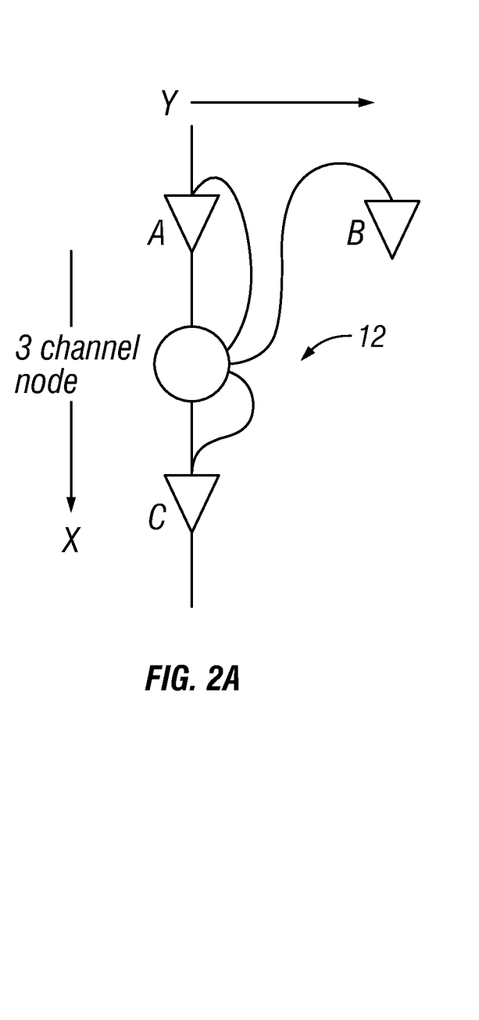
FIG. 2A through 2C shows example configurations of particle motion sensitive seismic sensors coupled to a nodal recorder.
Figure 2B:
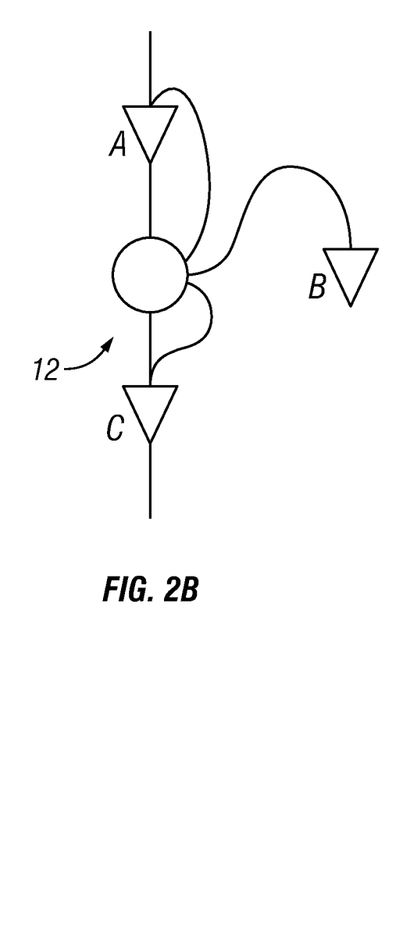
Figure 2C:
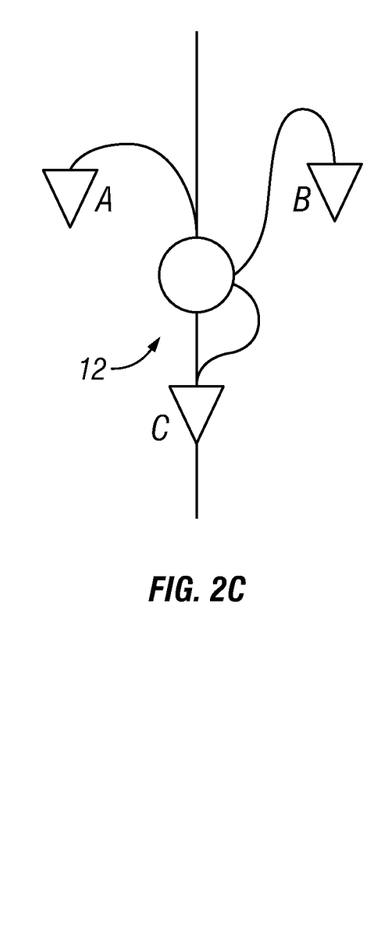

FIGS. 2A, 2B and 2C show example embodiments of arrangements of vertically sensitive seismic particle motion responsive sensors (e.g., geophones or accelerometers) associated with each of the recording nodes 12 so that horizontal gradients can be determined from the measurements made by the respective seismic sensors A, B, C connected to each of the sensor nodes 12. In the present example a total of six autonomous sensor nodes 12 (each with capability of recording three independent seismic sensor channels for a total of 18 individual sensor channels), may have the capability to replace 64 conventional, cable-connected seismic sensors.

In FIG. 2A, the in-line component of the horizontal gradient of the vertical wavefield can be determined from the difference between the signal detected by sensor A from the signal detected by sensor C. The sensor spacing, described above, is shown at X and may be chosen to be a minimum distance at which the gradient is detectable over the local noise. Similarly, the cross-line (transverse to the in-line) component of the horizontal gradient of the vertical wavefield can be determined from the difference between the signal detected by sensor B from the signal detected by sensor A. The cross-line distance is shown at Y and may be selected in a manner similar to the distance X. In the example deployment of FIG. 2A, the distance X between sensors A and C is the same as the distance Y between sensors A and B, and that the lines traversed, respectively between sensors A and C, and sensors A and B are substantially orthogonal to each other. The sensor node 12 may be disposed at any position convenient to the deployment, it being understood that the sensor node position in FIG. 2A is the intended geodetic position of the signal recordings made of the vertical wavefield.

FIG. 2B shows a similar sensor arrangement as in FIG. 2A, however, the distance between respective sensors A, B, C may require correction for the oblique angle subtended by the lines connecting sensors A and B, and C and B to correctly calculate the cross-line vertical wave-field gradient. In the configuration of FIG. 2C the sensors A, B, C may be equally separated at the corners of an equilateral triangle. Separations between the sensors may be selected as explained above would typically be greater than 10 m, but less than 20 meters, though larger separations may also be used in some circumstances. For smaller separations it may be possible to accurately position the sensors within a single sensor node 12. As is the case for FIG. 2B, the gradient calculation along the in-line direction I and the cross-line direction L may require distance correction for the angle subtended by the sensors A, B, C with respect to the inline and cross-line directions.

Using a multi-channel autonomous sensor node to acquire signals containing the vertical component of the velocity, acceleration or particle motion wavefield at three closely spaced locations may enable the local gradients of the vertical wavefield to be computed. The gradient may be calculated by determining a difference between signals detected by the respective sensors for each actuation of the seismic energy source (S in FIG. 1B). Determining the horizontal gradient of the vertical seismic wavefield may enable a significant reduction in required number and density of sensors used to acquire seismic data. Significantly less field equipment, and a smaller number of seismic traces may be used to develop the same seismic information as would otherwise be required with a cabled, single sensor per acquisition point seismic system.

Figure 3A:
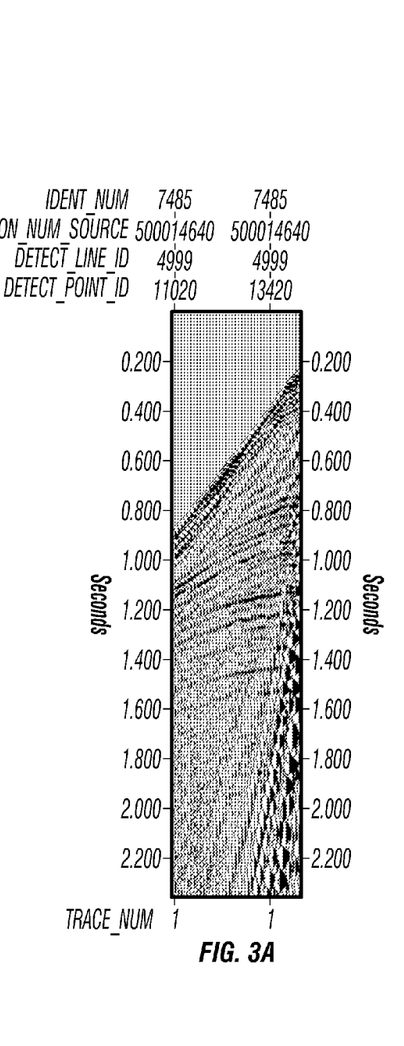
FIGS. 3A through 3C show, respectively, seismic data: a) at a recorded interval of 40 meters between sensors sinusoid; b) the same recorded data interpolated to 20 meter apparent spacing without gradient information; and c) interpolated to 20 meter apparent spacing with gradient information.
Figure 3B:
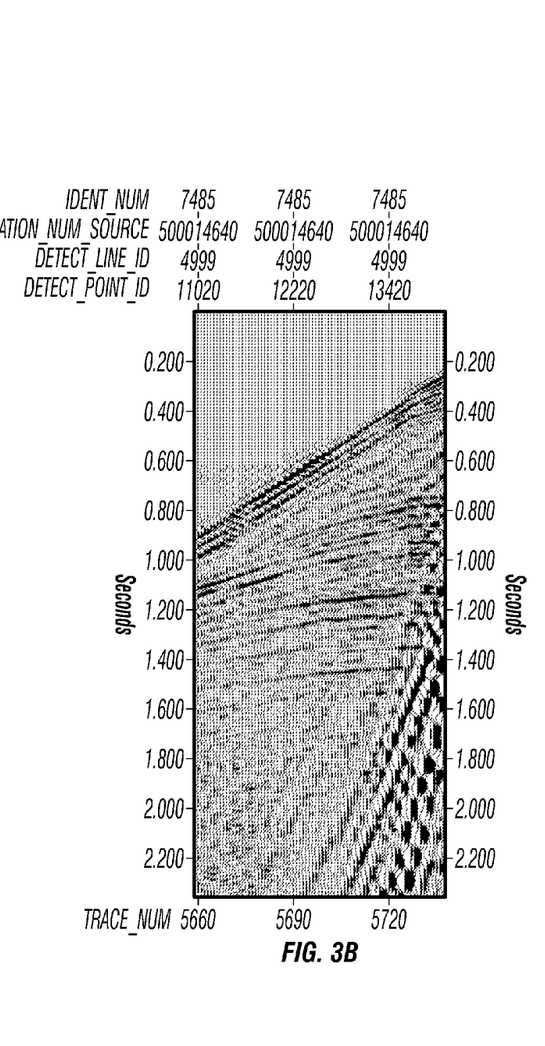
Figure 3C:
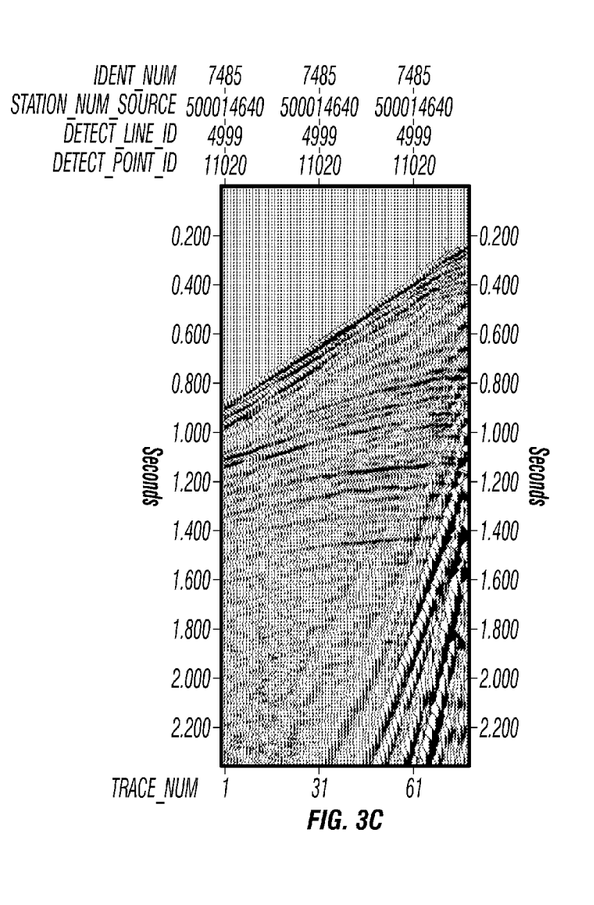

FIG. 3A shows example results of acquiring seismic signal data with a 40 meter spacing (i.e., distance d1) between individual seismic sensors. Note that there are some components of the seismic record which are spatially aliased. In interpolating spatially aliased seismic data without gradient information, the aliased components of the seismic data are incorrectly interpolated when the data are interpolated to a finer (e.g., 20 meter) spacing, as shown in FIG. 3B. However, if the gradient data are also used as part of the interpolation, then the aliased component of the data is fully recovered, as shown in FIG. 3C. The example data were recorded by deployment of two sensors separated by 10 meters, and wherein the mid points between the sensors were separated from each other by 40 meters. All the sensors were deployed along a single line. The gradient information was computed by determining the difference between signals detected by the two sensors deployed 10 meters apart at each mid point (separated from each other by 40 meters). In the present example the number of seismic traces obtained was the same as would have been recorded if the seismic signals had been detected using single sensors at a regular 20 meter spacing.

Figure 4A:
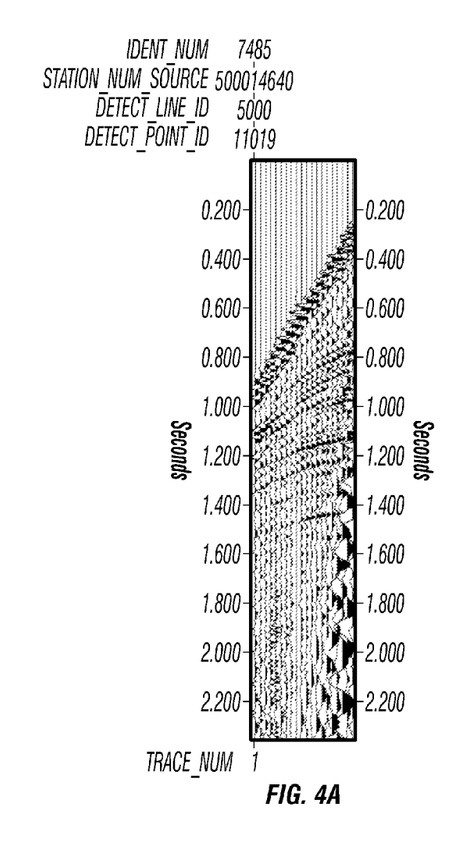
FIGS. 4A through 4C show, respectively, seismic data: a) at a recorded interval of 80 meters between sensors sinusoid; b) the same recorded data interpolated to an apparent sensor spacing of 10 meters with gradient information; and c) the frequency-wavenumber (f-k) representation of the result in FIG. 4B.
Figure 4B:
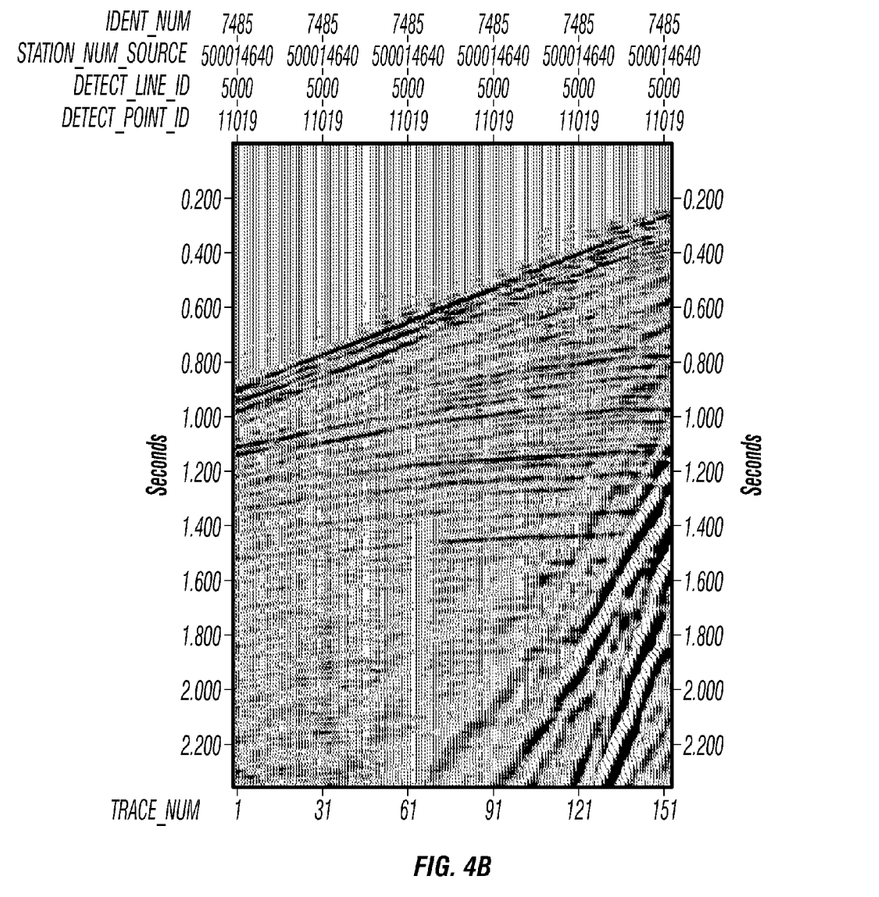
Figure 4C:
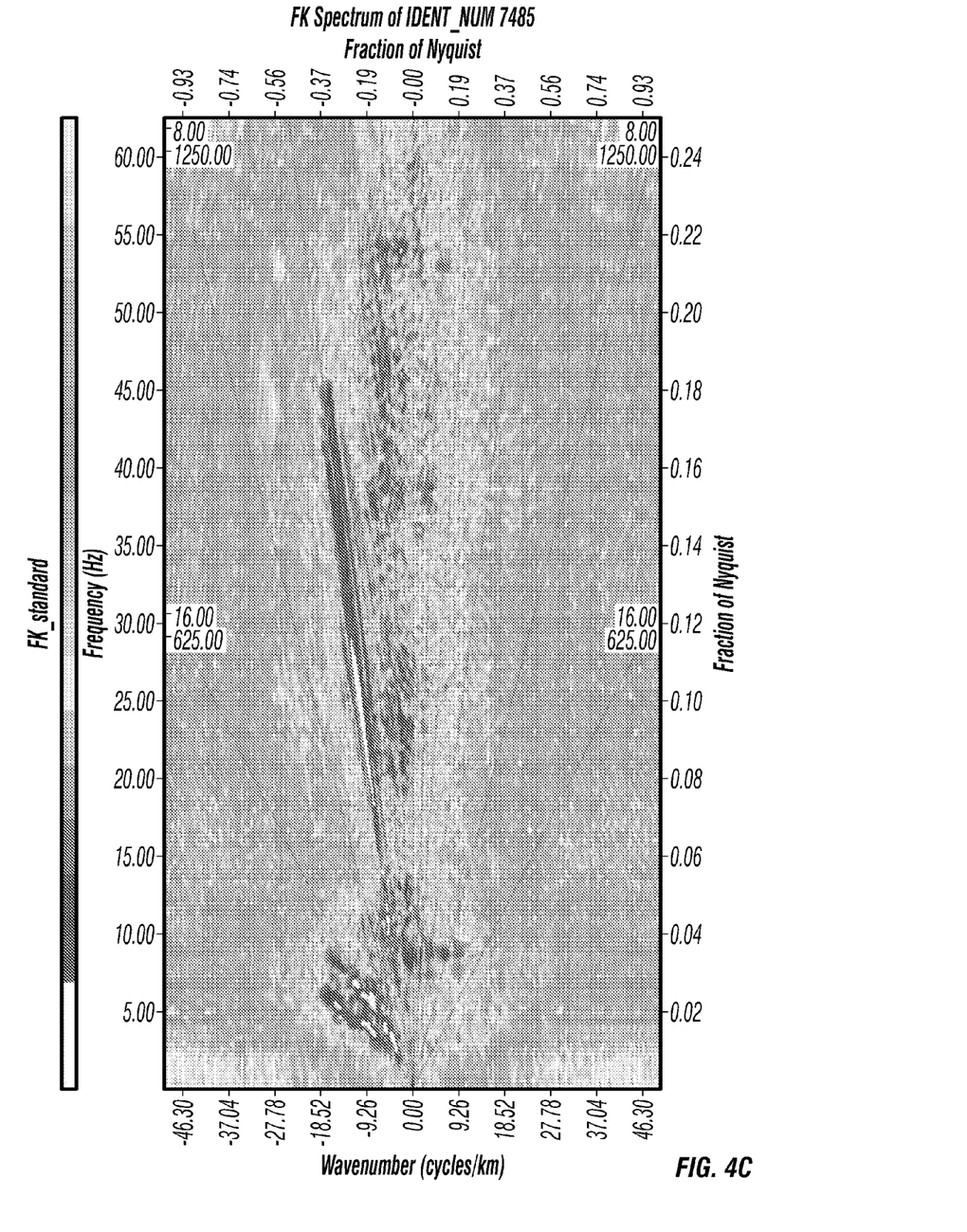

It is possible to further reduce the number of sensor nodes by increasing the distance d2 between sensor nodes (12 in FIG. 1B) and obtain similar results substantially free of spatial aliasing. FIG. 4A shows seismic signal data acquired where the sensor node spacing d2 was 80 meters (with pairs of sensors separated by 10 meters at each sensor node). FIG. 4B shows the sensor data from FIG. 4A interpolated to 10 meter intervals. Therefore only one-eighth of the total number of traces were recorded as actual sensor signals that are represented as individual traces in the final interpolated output. A frequency-wavenumber (f-k) representation of the data in FIG. 4B is shown in FIG. 4C to provide evidence of lack of spatial aliasing in the interpolated results.

By using available signal channels in sensor nodes known in the art to transmit and/or record signals related to the vertical component of the wavefield at at least three closely spaced but separate locations, information about the horizontal gradient of the vertical wavefield can be obtained in both the in-line and cross-line directions. The horizontal gradient information can be used to interpolate the detected vertical component signals of the seismic wavefield to other geodetic positions between the positions where groups of seismic sensors are disposed, while avoiding spatial aliasing limitations associated with conventional seismic sensor spacing techniques.

A possible benefit of the foregoing seismic signal acquisition method is that seismic sensor locations may be more widely separated, and seismic data can be interpolated to equivalent smaller sensor spacing, i.e., smaller than d1 from d2, thus requiring significantly less effort in the field and smaller numbers of sensor nodes to be deployed.

While the foregoing example is described in terms of multiple seismic sensors at each node location, it will be apparent to those skilled in the art that the same methodology is equally applicable to multiple seismic energy sources arranged as the sensors are arranged as shown in FIGS. 2A through 2C. The sources may be actuated individually at different times, and a horizontal gradient of the vertical wavefield may be determined at each sensor location using a difference between the signals detected from each source. Such arrangement may be made in both the in-line and cross-line directions for sources just as for sensors as explained with reference to FIGS. 2A through 2C. The sources may be actuated substantially contemporaneously if the sources are vibrators. In such cases, separately identifiable signals corresponding to each source in the source may be detected by each vibrator being driven by a signal substantially uncorrelated with a signal used to drive any other vibrator.

Large separations of sources, as is typically deployed in a seismic survey will not provide an accurate measurement of the local gradient as different parts of the wavefield may be measured by the seismic sensors. In example embodiments according to the present disclosure one may measure the local horizontal gradient of the vertical velocity field by using two or more sources positioned less than 20 meters apart, but more than 1 meter apart. The difference between the wave-fields received from such an arrangement of sources may be used to compute the horizontal gradient of the transmitted wave-field. In order to compute the full horizontal gradient field at least three sources should be used, preferentially in a pattern with some degree of orthogonality, but any triangle, such as an equilateral triangle as shown with reference to the sensors in FIGS. 2A through 2C would also be possible.

A possible benefit of using multiple sources as explained above is that it may make possible reducing the operational cost of seismic acquisition by reducing the number of source positions needed for any selected survey, and/or increasing the fidelity of the recorded and interpolated data.

Current source arrays deployed on land using vibrator sources may be configured into a suitable pattern, and then the signals from each vibrator unit may be recorded separately. Alternatively a single vibrator could be positioned at a number of closely spaced locations as explained above and activated sequentially. As explained above, multiple vibrators may also be operated simultaneously if each vibrator is driven by a signal that is substantially uncorrelated with the signals used to drive the other vibrators (i.e., the driver signals have substantially zero cross-correlation coefficient).

For impulsive sources such as dynamite used on land, separate dynamite deployment holes may be drilled in a similarly arranged pattern and the seismic signal data recorded separately for each actuation (or detonation).

Vibrator source seismic data acquired on the land surface does not have an equivalent of the source "ghost" in marine seismic data because the source is disposed on the surface. However, land dynamite sources used for seismic exploration can exhibit a source ghost from destructive interference between energy transmitted downwards from the source, with energy that initially travels upwards, and is subsequently reflected downwards from the earth's surface. This is because dynamite is, as will be appreciated by those skilled in the art, typically deployed at a selected depth below the ground surface. In a similar way that sources may be deployed at different positions horizontally to compute horizontal gradients, it would be possible to deploy dynamite sources at different depths, to similarly compute a vertical gradient, and remove the land source ghost.

In embodiments of a source arrangement as described above, a conventionally spaced array of seismic sensors may be used, as shown in FIG. 1A at 10 and 11, or multiple sensor nodes as shown at 12 in FIG. 1B may be deployed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying, comprising:
deploying a group of vertically sensitive seismic particle motion responsive sensors at each of a plurality of geodetic survey positions, the groups each comprising at least two sensors spaced apart by a first selected horizontal distance, the groups separated from each other by a second selected horizontal distance larger than the first selected horizontal distance;
recording signals detected by each of the sensors resulting from actuation of a seismic energy source; and
determining a vertical component and at least one of an in-line component and a cross-line component of a horizontal gradient of a vertical component of the seismic wavefield at each group location by determining a difference between the signals detected by each sensor in a respective group.

2. The method of claim 1 wherein each group comprises at least three sensors arranged such that signals are detected along mutually orthogonal directions in each group.

3. The method of claim 2 further comprising determining a horizontal gradient of the vertical component of the seismic wavefield at each group along two orthogonal directions by determining differences between signals detected by respective pairs of the at least three sensors.

4. The method of claim 1 further comprising interpolating the vertical component of the seismic wave-field to positions between groups using the at least one of an in line component and a cross line component of the horizontal gradient determined at each group location and the measurement of the vertical component from the signals detected at each group location.

5. The method of claim 4 wherein the interpolating comprises generating an apparent vertical component of the seismic wave-field at geodetic positions spaced closer together than a spatial aliasing limit possible using only a single vertical wavefield measurement at each group location.

6. The method of claim 5 wherein the second selected distance is at least twice a distance required to sufficiently spatially sample the vertical component of the seismic wave-field.

7. The method of claim 5 wherein the second selected distance is at least eight times a distance required to sufficiently spatially sample the vertical component of the seismic wave-field.

8. The method of claim 1 wherein the first horizontal distance is a minimum distance at which a gradient is detectable above a level of noise at any group position.

9. A method for acquiring seismic data, comprising:
deploying a plurality of seismic sensors having sensitivity to at least a vertical component of particle motion in a selected pattern proximate a ground surface;
deploying at least one seismic energy source proximate the seismic sensors capable of generating separately identifiable seismic signals, the at least one seismic source comprising at least one of,
at least two separate sources spaced from each other to have at least one of a cross-line and an in-line distance therebetween such that the seismic sensors measure a same part of a wave-field emitted by each of the separate sources, each of the at least two sources actuated so as to have a separately identifiable signal detected by a seismic sensors and
at least one source deployed at at least two separate positions and actuated at different times, the positions spaced from each other to have at least one of a cross-line and an in-line separation such that the seismic sensors measure a same part of a wave-field emitted by the at least one source;
detecting at least a vertical component of particle motion at each of the plurality of seismic sensors; and
determining at least one of an in-line component and a cross-line component of a horizontal gradient of a vertical component of the seismic wave-field determined from the vertical component of particle motion detected at each seismic sensor by determining a difference between signals measured by either (i) the seismic sensors from each source actuation from the at least one seismic source group or (ii) the seismic sensors from at least one source deployed at at least two separate positions and actuated at different times.

10. The method of claim 9 further comprising interpolating the vertical component of the seismic wave-field to positions between seismic sensors using the at least one of an in-line component and a cross-line component of the horizontal gradient determined at each sensor location and the vertical component of the seismic wave-field at each sensor location.

11. The method of claim 10 wherein the interpolating comprises generating an apparent vertical wave-field at geodetic positions closer together than a spatial aliasing limit possible using only a single vertical wavefield measurement at each sensor location.

12. The method of claim 9 wherein the separately identifiable signals are generated by actuating each source in the source group at a different time.

13. The method of claim 9 wherein the separately identifiable signals comprise each source in the source array being a vibrator driven by a signal substantially uncorrelated with a signal used to drive each of the other vibrators.

14. The method of claim 9 wherein a distance between the seismic sensors is at least twice a distance required to sufficiently spatially sample the vertical component seismic wavefield.

15. The method of claim 9 wherein a distance between the seismic sensors is at least eight times a distance required to sufficiently spatially sample the vertical component seismic wavefield.

* * * * *